April 30, 1963  B. L. BRUCKEN  3,087,321
AGITATING AND SPINNING MECHANISM
Filed Jan. 28, 1960  8 Sheets-Sheet 1

INVENTOR.
Byron L. Brucken
BY
Frederick M. Ritchie
His Attorney

April 30, 1963  B. L. BRUCKEN  3,087,321
AGITATING AND SPINNING MECHANISM
Filed Jan. 28, 1960  8 Sheets-Sheet 2

INVENTOR.
Byron L. Brucken
BY
Frederick M. Ritchie
His Attorney

April 30, 1963   B. L. BRUCKEN   3,087,321
AGITATING AND SPINNING MECHANISM
Filed Jan. 28, 1960   8 Sheets-Sheet 3

INVENTOR.
Byron L. Brucken
BY
Frederick M. Ritchie
His Attorney

April 30, 1963    B. L. BRUCKEN    3,087,321
AGITATING AND SPINNING MECHANISM
Filed Jan. 28, 1960    8 Sheets-Sheet 4

INVENTOR.
Byron L. Brucken
BY
Frederick M. Ritchie
His Attorney

April 30, 1963 B. L. BRUCKEN 3,087,321
AGITATING AND SPINNING MECHANISM
Filed Jan. 28, 1960 8 Sheets-Sheet 6

INVENTOR.
Byron L. Brucken
BY
Frederick M. Ritchie
His Attorney

April 30, 1963     B. L. BRUCKEN     3,087,321
AGITATING AND SPINNING MECHANISM
Filed Jan. 28, 1960     8 Sheets-Sheet 8

INVENTOR.
Byron L. Brucken
BY
Frederick M. Ritchie
His Attorney

United States Patent Office 3,087,321
Patented Apr. 30, 1963

3,087,321
AGITATING AND SPINNING MECHANISM
Byron L. Brucken, Dayton, Ohio, assignor to General Motors Corporation, Detroit, Mich., a corporation of Delaware
Filed Jan. 28, 1960, Ser. No. 5,174
21 Claims. (Cl. 68—23)

This invention relates to a domestic appliance and more particularly to an improved agitating and spinning mechanism for a clothes washer.

As the clothes washing art has evolved, agitating and spinning mechanisms for producing multiple speed operation have become more complex. In order to provide for variable speed operation a transmission is required which is comprised of many parts requiring lubrication. An oil bath has been the answer to the need for lubrication in the prior art devices. It is the purpose of this invention to provide a simplified agitate and spinning mechanism which will require fewer parts than prior art devices and which will eliminate the critical need for lubrication.

Accordingly, it is an object of this invention to provide a dry running type agitating and spinning mechanism for a washing apparatus.

It is also an object of this invention to provide a four-speed operation in an agitating and spinning mechanism with a single speed reversible induction motor.

A still further object of this invention is the provision of a dry-type roller drive prime mover system for an agitating and spinning mechanism.

Another object of this invention is the provision in the foregoing mechanism whereby the rollers act as over-running clutches when not driving the mechanism, thereby eliminating any mechanical disengaging means.

It is a further object of this invention to provide a roller drive mechanism wherein the rollers are self-energizing in the drive position, whereby the greater the load to be driven, the greater the driving force at the driving surfaces of the rollers.

An advantage of this invention lies in the fact that greater manufacturing tolerances are possible since rollers of this invention do not rotate on fixed centers, but are free to manipulate about a variable center of rotation.

Another advantage of this invention lies in the economy of design wherein fewer components are required to effect a multiple speed washing operation, such economy being accomplished through a multiple roller drive divided into two different driving centers of rotation to overcome the need for reversing clutches.

A still further advantage of this invention is embodied in the fact that belt and pulley operation is eliminated, to overcome the problem of belt matching and tensioning found in prior art multi-speed clothes washers.

Further objects and advantages of the present invention will be apparent from the following description, reference being had to the accompanying drawings wherein preferred embodiments of the present invention are clearly shown.

Figure 1:
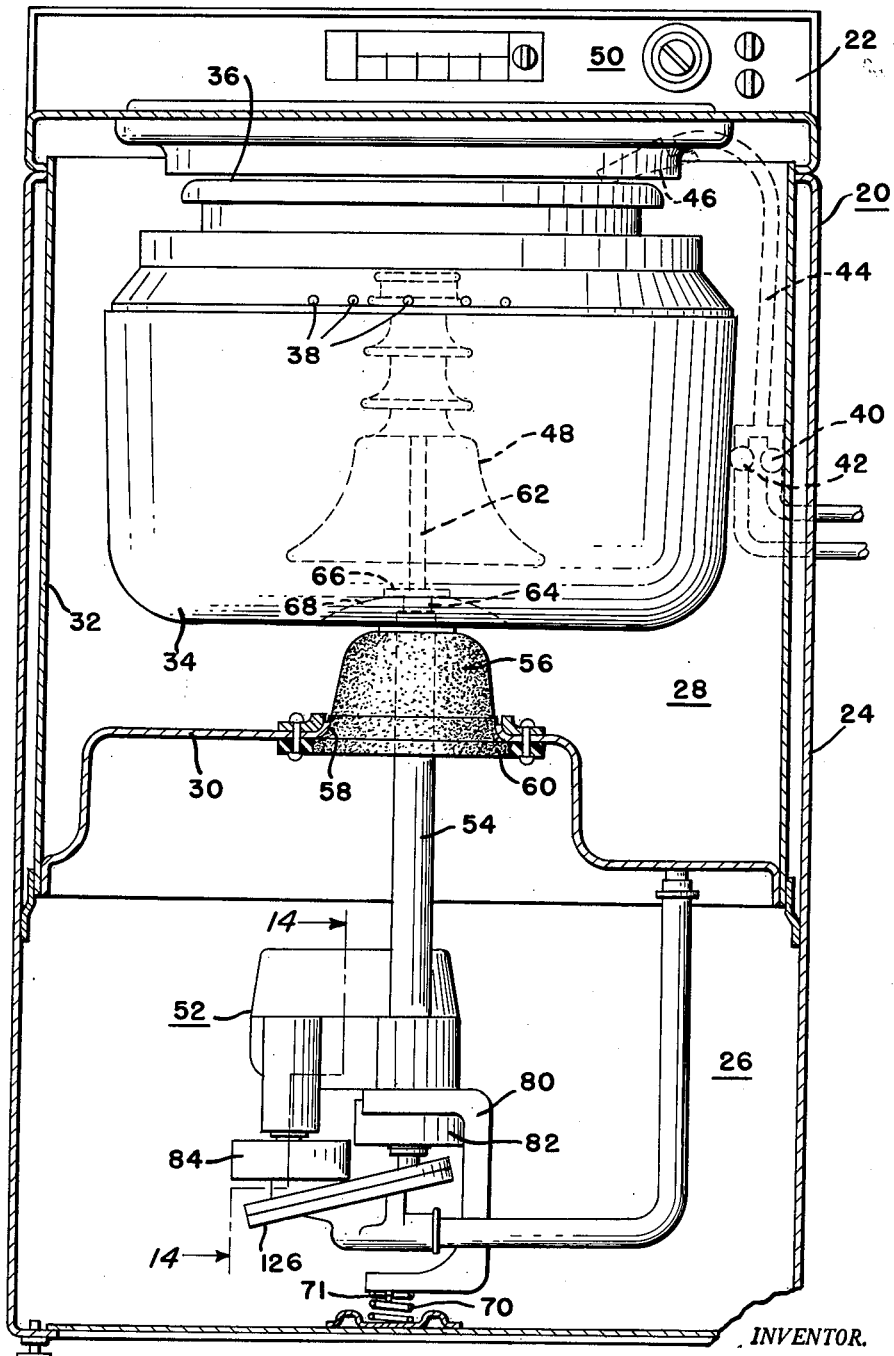
FIGURE 1 is a schematic sectional view partly in elevation of a multiple speed clothes washer provided with the dry running roller motivated agitating and spinning mechanism of this invention.

In accordance with this invention and with reference to FIGURE 1, a clothes washer 20 is comprised of a control housing portion 22 and a casing 24. The casing 24 is generally divided into a mechanism portion or compartment 26 and a washing portion or water container chamber 28. A generally centrally located bulkhead 30 separates the mechanism compartment 26 from the water container chamber 28 which is further bounded by a cylindrical water container wall 32. Within the water container 32 is a spin tub 34 having a top opening 36 and a plurality of centrifuging ports 38. The ports 38 are designed to permit the egress of water from the tub 34 when the tub is rotated at high speed. For filling the tub 34 with water a conventional water supply system may be provided with a hot water solenoid actuated valve 40 and a cold water solenoid operated valve 42 which are manifolded into a mixed water supply conduit 44 which terminates at a chute 46 overlying the opening 36 of the tub 34. Within the tub 34 an agitator or pulsator 48 is adapted to reciprocate to circulate or agitate the water admitted through the water supply conduit 44. Thus, clothing placed within the tub 34 are washed as the agitating action of the pulsator 48 causes surging currents of washing fluid and any included washing agent through the fabric. Conventional sequential operating timer means shown generally at 50 on the control housing 22 may be included to selectively admit water through the supply conduit 44, to spin the tub 34 and to vertically reciprocate the agitator or pulsator 48.

In the prior art mechanisms for selectively spinning the tube 34 and for oscillating or reciprocating the agitator 48 were rather complex and required an oil bath to lubricate the many parts required to set up the desired washing operation. Such an agitating and spinning mechanism is shown in the patent to Sisson, 2,758,685, issued August 14, 1956. The many spring clutches in this prior art device were required to provide the correct relationship between stationary and moving parts in the mechanism to set up either agitation or spinning. This invention is directed to a dry running roller type agitating and spinning mechanism shown generally at 52 in the mechanism compartment 26 of the clothes washer 20. The mechanism 52 is suspended from a stationary shaft enclosing housing portion 54 which is connected to a resilient cup-shaped mechanism support 56. The mechanism support 56, in turn, is affixed to an opening 58 in the bulkhead 30, sealing gaskets 60 being provided to provide a watertight connection. Extending upwardly from the stationary enclosing housing 54 is an agitate or pulsate shaft 62 to which the agitator 48 is connected and a spin shaft 64 which is connected as by a tub support nut 66 to the bottom wall 68 of the spin tub 34. Further details relating to the upper shaft support arrangement will be set forth hereinafter in connection with the description of FIGURE 15. In order to dampen excessive gyrating or swinging movement of the agitate and spinning mechanism's lower end, a snubber device, shown generally at 70, is included to receive the snubbing stud 71.

Figure 16:
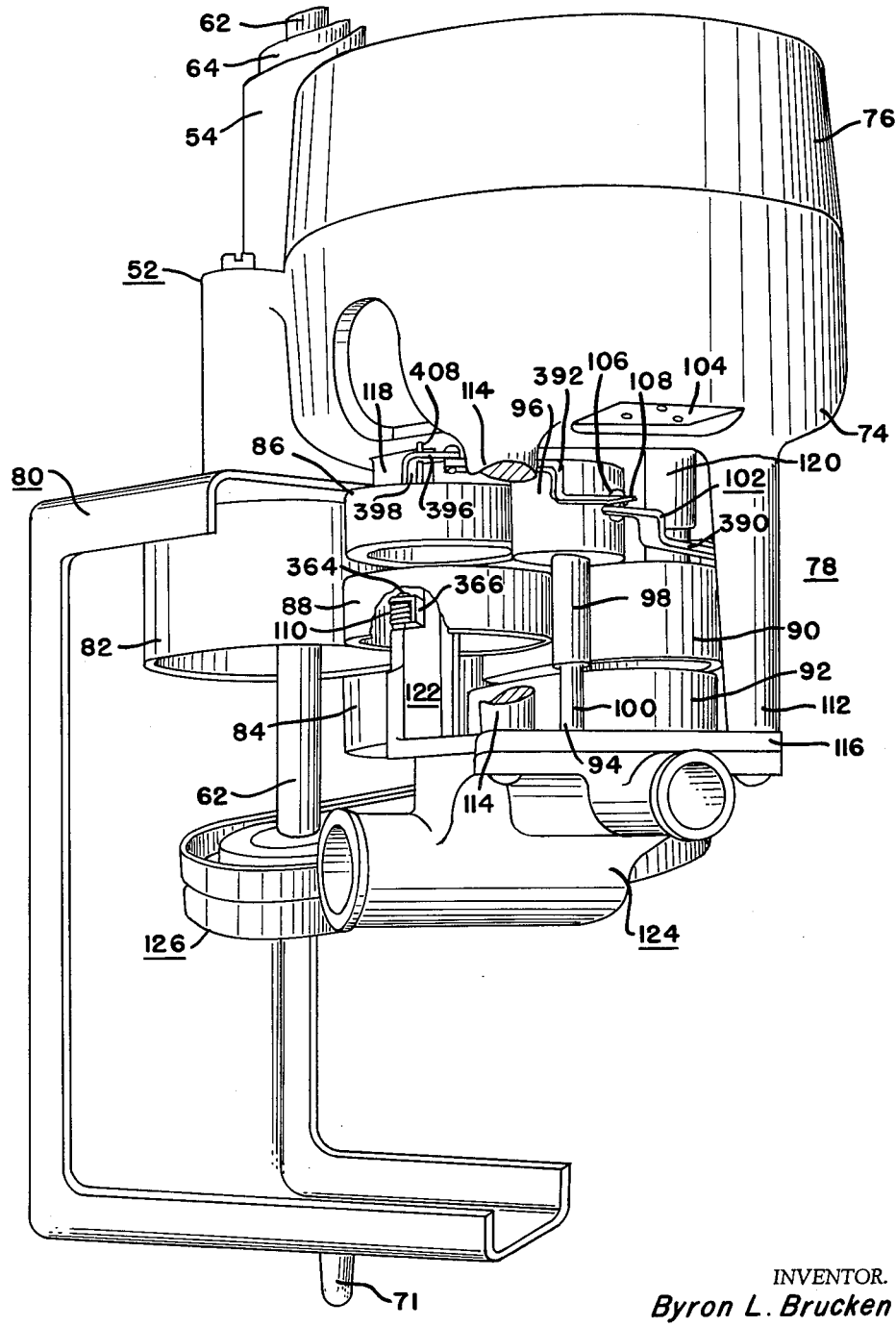
FIGURE 16 is a fragmentary perspective view of the roller drive agitate and spinning mechanism of this invention.

Reference may now be had to FIGURE 16 for a general understanding of the components included in the agitate and spin mechanism 52. The figure is fragmentary in that the shaft enclosing housing 54, the spin shaft 64 and the agitate shaft 62 have been broken off to emphasize the prime moving components or rollers of the mechanism 52. Generally, the agitate and spin mechanism 52 is comprised of a motor support housing or member 74 in which a reversible 1800 r.p.m. induction motor 76 is housed, a roller and drum motion transmitting or prime moving section 78 and a mechanism support bracket 80. Included within the motion translating arrangement 78 are a driven spin drum 82, a driven pulse or drum 84, a high-speed spin roller 86, a low-speed spin roller 88, a high-speed pulse or agitate roller 90 and a low-speed pulse or agitate roller 92.

For driving the spin and agitate rollers the motor 76 is provided with a driving pinion 94 which includes a spin driving porton 96, a spin and agitate driving portion 98 and an agitate driving portion 100. It will be noticed in the perspective view of FIGURE 16 that high-speed spin roller 86 lays adjacent the spin portion 96 of the pinion 94; the low-speed spin roller 88 and the high-speed agitate roller 90 lay adjacent but on opposite sides of the spin and agitate portion 98; and the low-speed agitate roller 92 lays adjacent the agitate portion 100. Thus, the driving pinion 94 may be connected for selectively driving any one of the spin and agitate rollers 86, 88, 90 and 92, as will be described more fully hereinafter.

Each of the rollers 86, 88, 90 and 92 are continuously spring biased into engagement with the driving pinion 94 and either the spin drum 82 or the agitate drum 84. This continuous bias effects one of the major concepts of this invention in that it permits the rollers to be self-energizing during those periods when they are engaged in driving and to merely idle or override in those situations when they are not driving. Means for selecitvely choosing the roller which will be driving at any given time is determined by both the direction of rotation of the driving pinion 94 and the positioning of the high-speed rollers 86 and 90.

Figure 8:
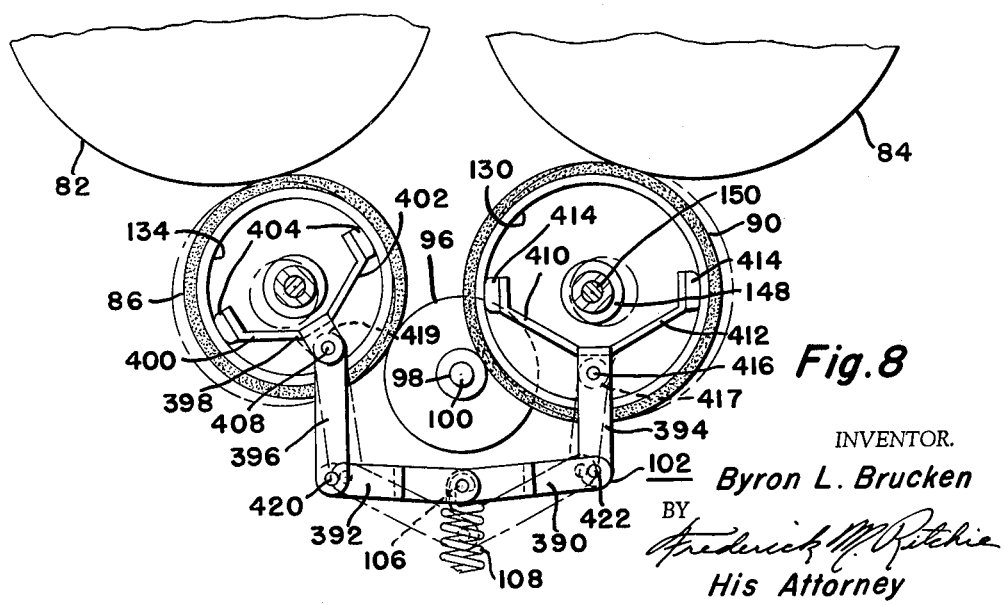
FIGURE 8 is a fragmentary elevational view taken along line 8—8 in FIGURE 3 to show the high speed portion of the roller drive prime moving system for the agitating and spinning mechanism of this invention.

To provide for low-speed spin or agitate a high-speed roller disengaging linkage, shown generally at 102, is included and adapted to pivot the rollers 86 and 90, respectively, out of continuous engagement with the driving pinion 94 and the spin drum 82 and agitate drum 84 (details in connection with FIGURE 8). This disengaging action is accomplished by a solenoid adapted to be positioned in the recess 104, but removed in FIGURE 16 for clarity of illustration. The solenoid exerts a pull through a spring 108 on a center pin 106 of linkage 102 to withdraw the rollers 86 and 90 from driving engagement. Suffice it to say at this point that the four rollers 86, 88, 90 and 92 are all mounted with considerable play at their centers of rotation so that the rollers are free to move laterally universally within certain limits. A portion of the low-speed spin roller 88 has been broken away to show a spring loaded bracket 366 which is used to provide the continuous bias of the roller 88 into engagement with the driving pinion 94 and the spin drum 82. A similar spring biasing arrangement is included internally of the low-speed agitate roller 92. Detailed explanation of the biasing arrangement for the spin and agitate rollers will be described more fully hereinafter.

A support means such as the motor support housing or support member 74 is provided with depending spacer columns 112 and 114 to support a die cast pump cover and support plate 116. Interposed in this relationship the high-speed spin roller 86 and high-speed agitate roller 90 are rotatably mounted on depending bosses 118 and 120, respectively. On the other hand, protuberances or bosses, such as 122, are cast integrally with the pump cover 116 and extend upwardly to provide the rotatable support for the low-speed rollers 88 and 92.

Affixed to the under side of the pump cover 116 is a pump housing, shown generally at 124. The driving pinion 94 is adapted to extend into the pump housing 124 where it is affixed to an impeller 125 (FIGURE 14) for motivating a pumping action during energization of the motor 76.

The pulsating or vertically agitating action imparted to the agitator 48 is effected through a pulsator arm assembly, shown generally at 126. This pulsator arm assembly is given its rocking action by the rotation of the agitate drum 84 and this, in turn, causes the agitate shaft 62 to reciprocate vertically within the concentric spin shaft 64 and the stationary enclosing housing 54. Further details in this regard will be set forth in connection with FIGURES 2 and 12.

Figure 3:
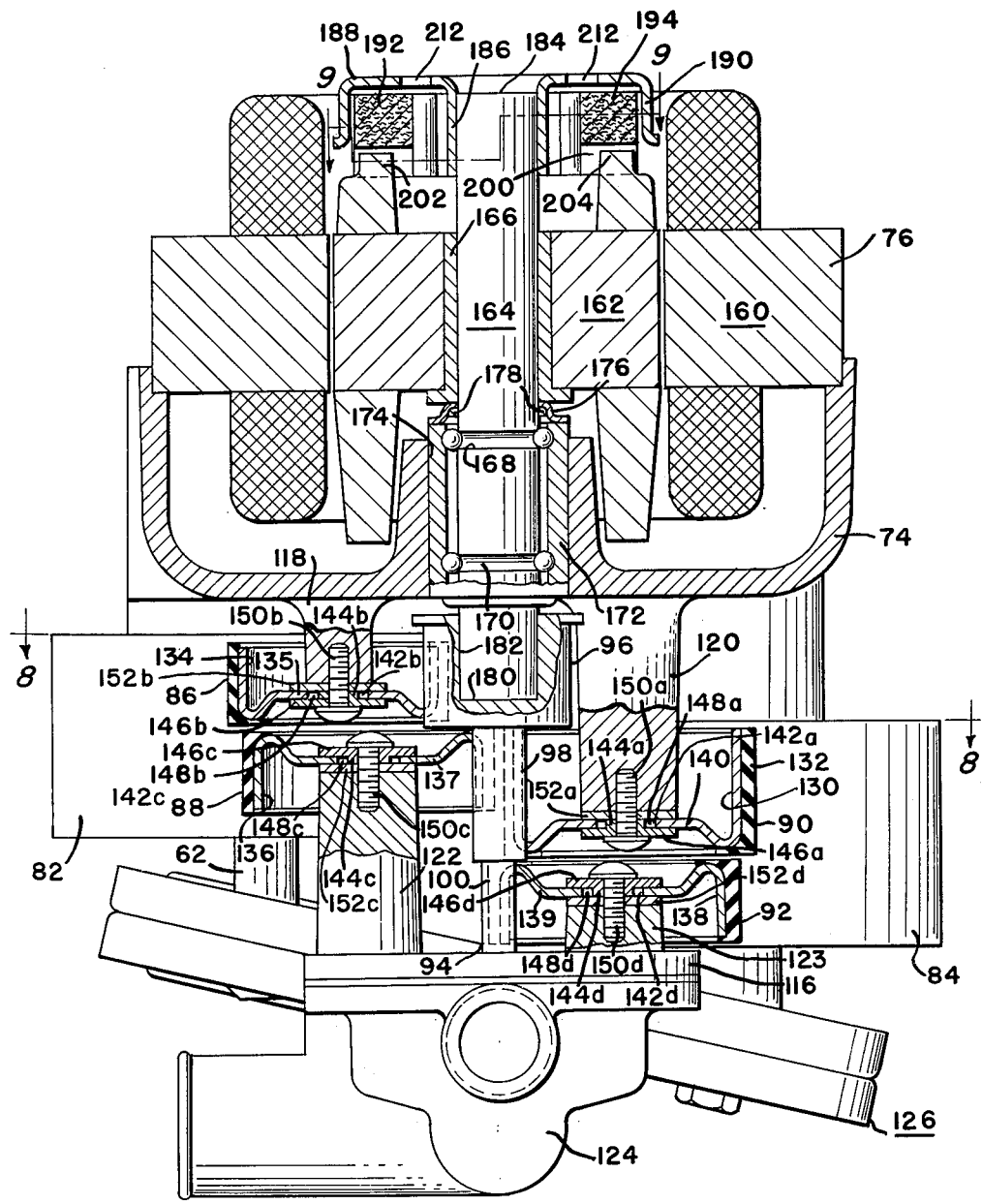
FIGURE 3 is a sectional view taken along line 3—3 in FIGURE 14.

With the foregoing background re FIGURE 16 the operation briefly stated is as follows. Consider the high-speed selection linkage 102 as disengaged to thereby engage the high speed rollers 86 and 90. In this relationship and with the pinion spin portion 96 rotated counter-clockwise (the surface facing the viewer in FIGURE 16 moving from right to left), the high-speed spin roller 86 will be urged or self-energized into driving relationship between the pinion spin portion 96 and the spin drum 82 (the rollers 88, 90 and 92 will overrun at this time). The rotation imparted to the spin drum 82 will be carried through to the spin shaft 64 to which the drum 82 is affixed. Since the spin tub 34 is connected to the spin shaft 64, the spin tub 34 will be rotated at a high rate of speed. With the motor 76 reversed and the spin and agitate pinion portion 98 moving clockwise so that the surface facing the viewer of FIGURE 16 moves from left to right, the high-speed agitate roller 90 will transmit the rotation of the driving portion 98 to the agitation drum 84 which, through a crank arrangement to be described hereinafter, causes the pulsator arm 126 to rock and thereby vertically to reciprocate the agitate shaft 62 at high speed. Rollers 86, 88 and 92 overrun during high-speed agitate. With the high-speed selection linkage 102 engaged, the high-speed rollers 86 and 90 are disengaged from the driving pinion 94 and the spin and pulse drums 82 and 84, respectively. Thus, the operation of the continuously inwardly biased low-speed rollers 88 and 92 will operate in substantially the same manner as that described in connection with the high-speed rollers. Low-speed agitate will occur when pinion 94 rotates clockwise and roller 88 will overrun. Conversely, low-speed critical tolerances in the construction of a product adds to the cost of manufacture. It is here proposed to eliminate critical tolerances in the mounting arrangement of the self-energizing rollers 86, 88, 90 and 92. This relationship is best seen in FIGURE 3 wherein the roller construction is set forth. In connection with the high-speed pulse or agitate roller 90 the construction is shown comprised of a drawn cup 130 to which is bonded a smooth resilient tread 132. Polyurethane has been used for the tread 132 but any suitable material may be used which is capable of extended wear under the continuous action of transmitting heavy driving forces. Each of the rollers is constructed in substantially the same manner with the roller 86 being formed on a drawn cup-like support 134; the roller 88 formed on the support cup 136 and the roller 92 formed on the support cup 138. Each of the support cups 130, 134, 136 and 138 is formed respectively with a disc like web 140, 135, 137 and 139. The web 140 is provided with an oversized opening 142a to receive a shoulder 144a on a roller adapter 146a. Note that the diameter of shoulder 144a is less than the diameter of the web opening 142a to provide a clearance 148a. This clearance produces the variable center of rotation which permits the tolerances to remain less critical in the assembly of the rollers to form the motion transmitting section 78. A bolt 150a is effective to secure the adapter 146a and the roller 90 to the roller support or boss 120. A retainer washer 152a is positioned opposite the adapter 146a to complete the annular pocket 148a in which the periphery of the web opening 142a may move. It should be emphasized that the web 140 of the roller 90 moves relatively rotatably to the stationary adapter 146 and the washer 152. Note also that the depth of the shoulder 144a is slightly greater than the thickness of the web 140. In this regard, the roller 90 is free to move laterally to the extent of the clearance 148a. In this manner the roller 90 is capable of substantially universal movement in a lateral or horizontal plane and is free to rotate as an idler between the driving agitate and spinning portion 98 of the drive pinion 94 and the agitate drum 84. The description of the high-speed agitate roller 90 is believed to suffice for the rollers 86, 88 and 92 as well. Similar parts used in assembling the rollers 86, 88 and 92 have been given the same reference number with the suffix b, c and d added, respectively. Also, the other rollers are provided with the same polyurethane tread material used on high-speed agitate roller 90.

FIGURE 3 is also useful in showing the relationship between the driving pinion 94 and the motor 76. More particularly, the motor 76 is comprised of a stator portion 160 and a rotor 162. The stator 160 is solidly affixed to the motor housing 74 and, thus, provides a positive alignment for the rotor 162 with the driving pinion 94 therebelow. A motor shaft 164 is journaled in a sintered metal bearing 166 which is press fit to the rotor 162. At the same time, the motor shaft 164 is formed with a groove 168 and 170 to provide the inner races for a double row ball bearing 172 pressed into a cylindrical opening 174 in the motor casing 74. Interposed between the sintered metal shaft bearing 166 and the double row ball bearing 172, commonly called a water pump bearing, there is located a grease seal retainer 176 to prevent the egress of grease or lubricant from the bearing and the ingress of dirt to an annular felt washer 178. The lower terminus 180 of the motor shaft 164 is press fit into a drilled out socket 182 in the spin portion 96 of the driving pinion 94. Thus, any time that the motor shaft 164 is rotated, the driving pinion 94 will be rotated simultaneously.

Figure 9:
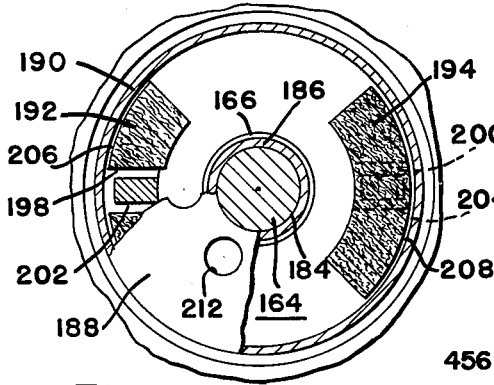
FIGURE 9 is a fragmentary sectional view taken along line 9—9 in FIGURE 3 to show the slipping clutch drive arrangement of this invention.

It is desirable to include a slipping clutch arrangement in this invention to cushion the shock of sudden acceleration or change of direction in the motion transmitting section 78. For this reason the upper terminus 184 of the motor shaft 164 is press fit into a cylindrical collar 186 of a clutch drum or clutch housing 188. In addition to the inner collar 186 the housing 188 is provided with a depending radially outer flange 190 which provides the driving surface on which a pair of centrifugal clutch shoes or segments 192 and 194 are adapted to operate. With particular reference to FIGURE 9, the clutch segments 192 and 194 are shown to include a notched out portion 198 and 200, respectively, to receive a projecting rib 202 and 204, respectively, extending upwardly from and integral with the rotor 162. The protuberances or ribs 202 and 204 serve as guide and driving lugs for the centrifugally actuated shoes 192 and 194. When the motor 76 is energized to rotate the rotor 162 in either direction, the lugs 202 and 204 will engage either side of the notched out portions 198 and 200 to cause the clutch segments or shoes 192 and 194 to rotate simultaneously with the rotor. As the rotating speed of the rotor 162 accelerates the driving shoes 192 and 194 will tend to move radially outwardly with the lugs 202 and 204 acting as guides in their radially outward movement. Thus, the radially outer curved surfaces 206 and 208, respectively, of the segments 192 and 194 will engage the depending annular driving flange 190 on the clutch drum or housing 188. As the centrifugal force between the flange and the clutch segments increase, the clutch housing 188 will be dragged along by the frictional engagement of the driven clutch segments 192 and 194 therewith. Since the motor shaft 164 is positively affixed to the clutch housing 188, any movement of the clutch housing will be transmitted to the shaft 164. Thus, the motor shaft 164 and consequently the driving pinion 94 will be accelerated gradually as the centrifugal force between the clutch housing flange 190 and the clutch segments 192 and 194 increase. It should be seen that a shock absorbing driving relationship is therefore accorded the motor and driving pinion 94. In order to ventilate the slipping clutch arrangement of this invention, the clutch housing 188 is provided with apertures such as 212 in the top wall thereof.

Figure 2:
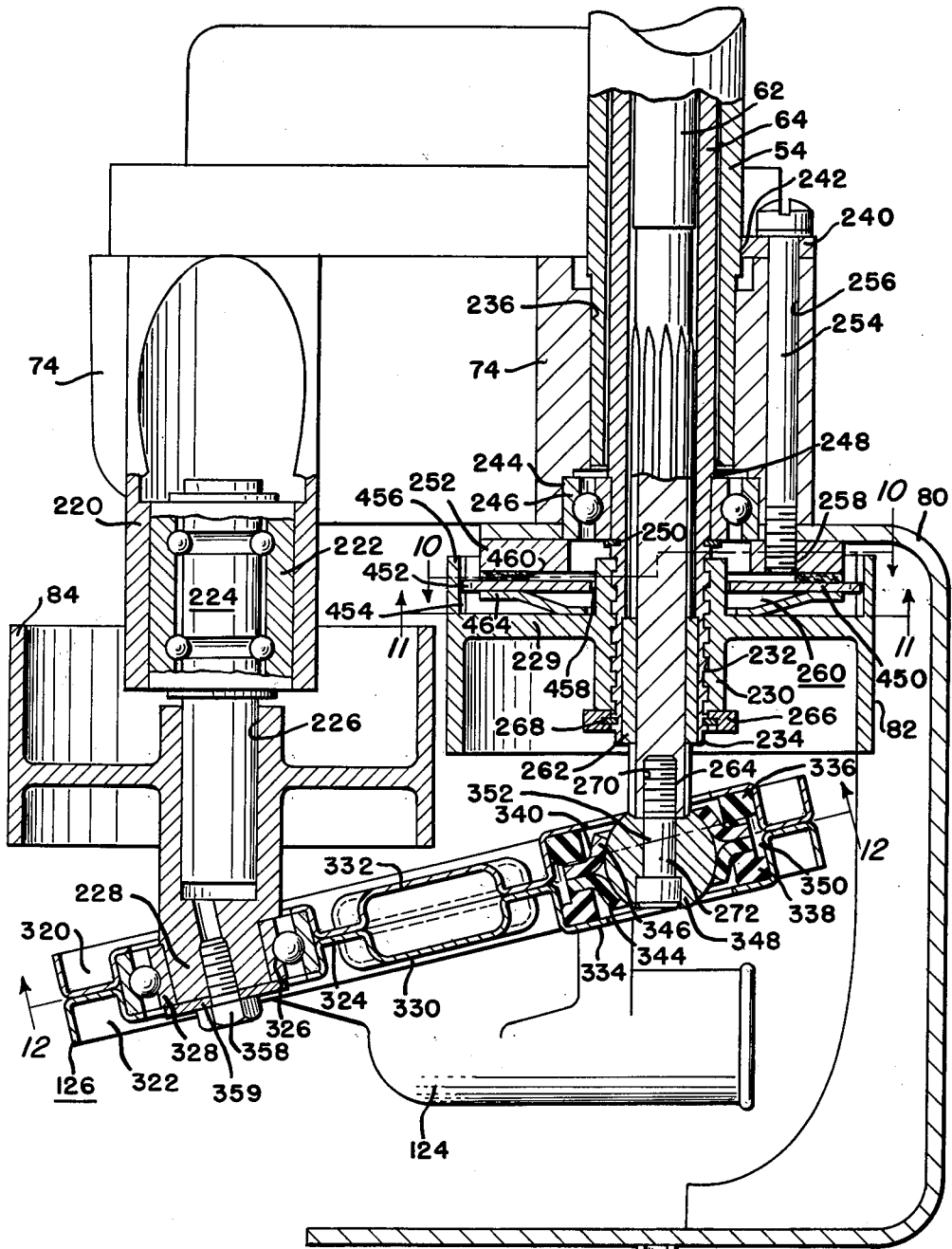
FIGURE 2 is a sectional view taken along line 2—2 in FIGURE 14.

Although the high and low-speed spin rollers 86 and 88 and the high and low-speed agitate rollers 90 and 92 are mounted for limited universal movement about a variable center of rotation, the spin drum 82 and the agitate drum 84 are positioned in an affixed rotatable relationship to the housing 74. With reference to FIGURE 2, the motor housing 74 is formed with an integral depending hollow boss 220 which encloses a double row bearing 222 press fit therein. Journaled in the bearing 222 is an agitate drum support shaft 224. This agitate drum support shaft is press fit into a central collar 226 in the drum 84. More particularly, the agitate drum 84 is formed so that its central collar 226 depends to form a pulsator arm attachment portion 228. The terminal portion 228 is formed at an angle to the axis of the roller 84, thereby to form a crank portion for insertion in one end of the pulsator arm assembly 126. The width or face of the agitate drum 84 must be sufficient to accommodate both the high and low speed agitate rollers 90 and 92.

On the other hand, the spin drum 82 is formed with a central collar 230 which is threaded internally at 232 to provide for relative axial movement of the spin drum 82 along a threaded lower portion 234 of the spin shaft 64. The assembly of the spin drum 82 at the lower end of the spin shaft 64 will now be described more fully. The motor casing 74 is formed with a cylindrical opening 236 to receive the stationary enclosing housing 54 of the agitate and spin mechanism 52. The shaft housing 54 inserts within the opening 236 until a tab 240 which is welded as at 242 to the shaft housing abuts the top surface of the motor housing 74. The opening 236 is enlarged at 244 to receive a spin shaft lower bearing 246. Within the shaft enclosing housing 54 the spin shaft 64 extends downwardly out of the housing 54 where a collar 248 rests on the inner race of the bearing 246. A snap ring 250 locks the bearing and the spin shaft 64 together to prevent the spin shaft from moving upwardly within the housing 54. An annular brake disc 252 mounts below the bearing 246 and the support bracket 80. Three assembly bolts 254 insert through another opening 256 in the housing or support member 74 to threadedly engage the brake disc 252 as at 258. Thus, the shaft housing 54, the motor housing or support member 74, the spin shaft lower bearing 246, the support bracket 80 and the brake disc 252 are bolted together in assembled relationship. Note that the ball bearing 246 performs a dual function in taking the radial load of the spin drive on the spin drum 82, as well as the downward thrust load of the spin tub which is transmitted through the spin shaft 64 and the spin shaft shoulder 248 to the inner race of the bearing 246. This consolidation of two thrusts on one bearing is a further economy in the design of this invention.

Interposed between a webbing 229 and the brake disc 252 is the brake system of this invention, shown generally at 260. Braking effort is actuated by relative movement set up during deceleration between the agitate and spin mechanism 52 and the spin tub 34. When the spin cycle is deenergized, the tendency of the loaded spin tub 34 is to continue rotating for a longer time than the motion transmitting section 78, i.e., the moment of inertia of the tub 34 is greater than that of the mechanism 52. This tendency toward relative turning movement, therefore, actuates the braking system 260 as will be described more fully hereinafter.

The description of the novel dry type bearing arrangement for an agitate and spin mechanism continues. At the lower end of the spin shaft 64 is located a lower pulsator or agitator shaft bearing 262 of the oilless type which is keyed to the spin shaft 64 and connected for relative axial movement to the splined end 264 of the agitate shaft 62 (FIGURE 2). Thus, it is to be noted that the shaft 62 may move vertically relatively to the spin shaft 64, but is rotated simultaneously with the spin shaft 64. A keeper 266 circumscribes the lower end of the spin shaft 64 to prevent the threaded spin drum 82 from falling off the lower end of the spin shaft. A snap ring 268 completes the locking arrangement whereby the keeper 266 retains the spin drum 82 in threaded relationship to the spin shaft 64. The splined end 264 of the agitate shaft 62 is formed with a tapped opening 270 to receive a pulsator arm assembly attachment bolt 272. When the spin drum 82 is being rotated by either the high-speed spin roller 86 or the low-speed spin roller 88, the drum 82 is screwed downwardly into engagement with the keeper 266. This provides a secure driving engagement between the spin drum 82 and the spin shaft 64, the latter being rotated in response to the motion of the spin drum 82. As aforesaid, during deceleration of the spin tub 34 after the deenergization of the motor 76 at the conclusion of a spin cycle, the spin drum 82 will screw itself upwardly along the spin shaft threaded end portion 232 to actuate the braking system 260.

Figure 15:
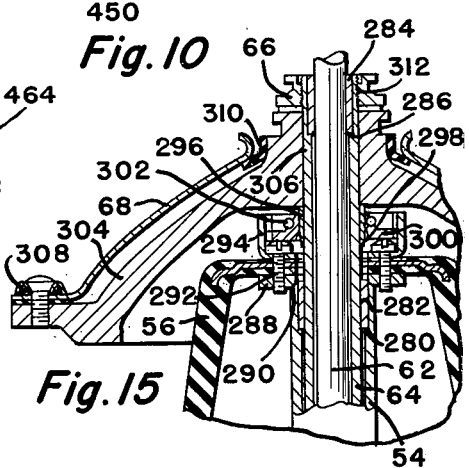
FIGURE 15 is a fragmentary sectional view of the upper spin and agitate shaft bearing support arrangement.

At the upper end of the enclosing housing 54, dry bearing surfaces are provided as well as a water seal arrangement to prevent water entering the enclosing housing 54. With reference to FIGURE 15, the enclosing housing 54 terminates adjacent the top of the resilient mechanism support 56. The upper open end of the housing 54 is provided with a shoulder 280 on which is seated an oilless bearing 282. This bearing may be of the Teflon dry type or perhaps a sintered metal bearing. A similar type bearing 284 is positioned upon a shoulder 286 in the upper open end of the spin shaft 64. This bearing 284 provides for relative axial movement between the spin shaft 64 and the pulsator shaft 62, whereas the bearing 282 acts to journal the relative rotating movement between the spin shaft 64 and the enclosing housing 54. An attachment ring 288 is welded as at 290 to the enclosing housing 54 to provide the means whereby a fastener, such as bolt 292, may position a seal retainer 294, the resilient support 56 and the attachment ring 288 in sandwiched relationship, thereby positively affixing the spin shaft housing 54 to the resilient support member 56. A stainless steel sleeve 296 is seated on a shoulder 298 on the spin shaft 64. This sleeve acts as a sealing surface on which an annular water seal 300 is adapted to to move. An annular tub reenforcement collar 304 is provided with a central opening 306 to overfit the projecting end of the spin shaft 64. This reenforcement collar 304 is adapted to seat on the top of the stainless steel sleeve 296 and extends outwardly to a point where it may be fastened to the bottom wall 68 of the spin tub 34 in waterproof manner as at 308. An additional seal 310 is provided between the reenforcement collar 304 and the radially inwardly open end of the tub bottom wall 68. The spin shaft 64 is threaded at 312 to receive a tub support nut 66 which locks the tub 34 and its reenfrocement collar 304 into assembled relationship with the spin shaft 64.

Figure 12:
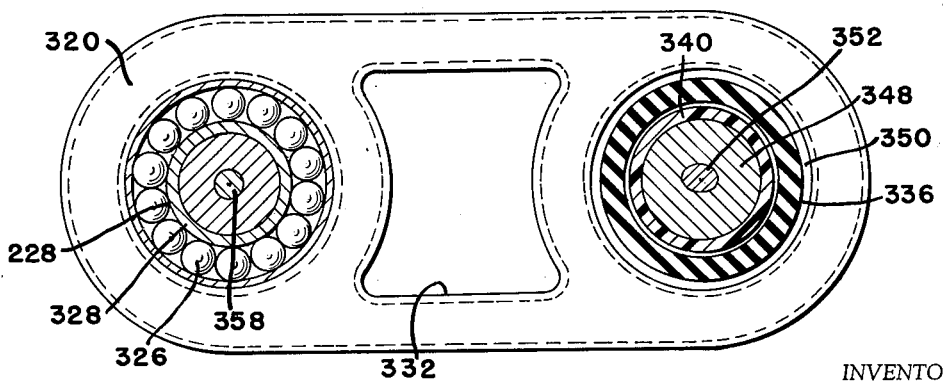
FIGURE 12 is a sectional view taken along line 12—12 in FIGURE 2 to show the pulsator arm assembly.

The pulsator arm assembly may best be understood with reference to FIGURES 2 and 12. The assembly 126 is comprised of an upper pulsator arm 320 and a lower pulsator arm 322 which are adapted to be spot welded together along their mating faces 324. Prior to spot welding the arms together, a ball bearing 326 is inserted. This bearing 326 is sized to slip over the crank driver end 228 of the agitate drum 84, the inner race 328 thereof tightly fitting over the crank driver 228. The arms 320 and 322 are drawn into cuplike formations 330 and 332 to increase the strength of the pulsator arm assembly 126. The opposite end of the pulsator arm assembly is formed into a spherical bearing housing portion 334. Within the housing portion is an annular upper bearing retainer ring 336 and a lower bearing retainer ring 338. The rings 336 and 338 may be generally of neoprene with a shore hardness of 50±5. Interposed between the retainers 336 and 338 is an upper spherical bearing ring 340 and a lower spherical bearing ring 344. The rings 340 and 344 are formed with generally spherically shaped flanges or lips, such as 346, to receive a spherical bearing 348 of sintered bronze impregnated with plastic petroleum or having some other suitable permanent lubricating characteristic. Note that an annular clearance 350 is provided between the end walls of the bearing housing portion 334. This is to permit the spherical bearing end of the pulsator arm assembly 126 to breathe or allow for relative lateral movement of the spherical bearing 348 within its support housing portion 334. The spherical bearing 348 is provided with a central aperture through which a mounting bolt 352 threadedly engages the lower splined end 264 of the agitate shaft 62. At the opposite end of the pulsator arm assembly a fastening means such as a bolt 358 and a retainer washer 359 is utilized to hold the inner bearing race 328 and thus the pulsator arm assembly 126 on the crank portion 228.

Figure 13:
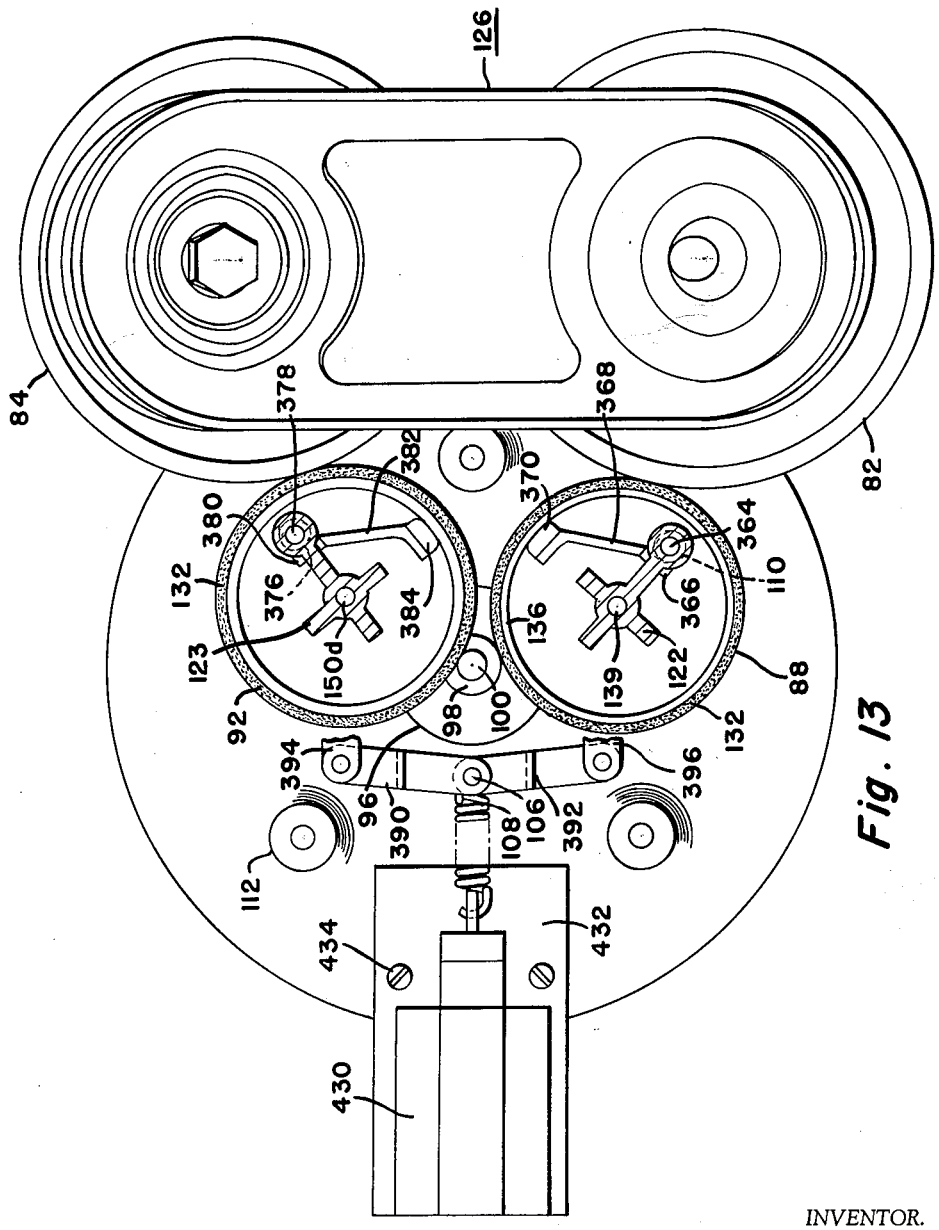
FIGURE 13 is a sectional view partly in elevation taken generally along line 13—13 in FIGURE 14 to show the low speed portion of the roller drive prime moving system for the agitating and spinning mechanism of this invention.

The continuous bias of the spin and agitate rollers will now be described with reference to FIGURES 13, 14 and 16. As is generally seen in FIGURE 16, a spring 110 is provided for urging the low-speed spin roller 88 into engagement with both the driving pinion portion 98 and the spin drum 82. More particularly and with reference to FIGURE 13, a spring 110 is wrapped about a pivot pin 364 and adapted to bias against a right-hand bracket 366 having a biasing arm 368 integral therewith which extends to a position adjacent the depending skirt 136 of the roller 88. A nylon bumper 370 is interposed between the skirt and the arm 368 to minimize noise and to improve sliding contact. As aforesaid, the roller 88 has an enlarged opening 142c in its web 137 to allow for excessive clearance 148c so that the roller 88 may move universally about its retainer bolt 150c. The action of the spring 110 and bracket 366 is continuously to seek or tend to wedge the roller 88 between the peripheries of the agitate and spin driving pinion portion 98 and the spin drum 82.

In similar fashion the low-speed pulse roller 92 is mounted upon a boss 123 (FIGURE 14) in a manner to permit universal lateral movement about a retainer bolt 150d, clearance 148d being provided in the web of the roller support cup 138 to allow for such universal lateral movement. Here again, a spring 376 is wrapped about a pivot pin 378 which is affixed in the boss 123 adjacent the roller pivot retainer bolt 150d. A left-hand bracket 380 is adapted to pivot about the pin 378 and is urged by the spring 376 in a manner to cause a biasing arm 382 integral therewith to bear against the depending skirt of the roller support cup 138 through a nylon bumper 384. This biasing action, as in the case of the low-speed spin roller 88, forces the low-speed agitate roller 92 between the agitate drum 84 and the low-speed agitate pinion portion 100. The biasing effect of both springs 110 and 376 is to make the rollers 88 and 92 self-energizing. That is, when the pinion portion 98 is rotating in a counterclockwise direction as viewed in FIGURE 13, the roller 88 tends to wedge itself between the pinion 98 and the periphery of the spin drum 82, thereby to transmit motion from the pinion to the spin drum. At the same time, the biasing effect of the spring 376 on the agitate roller 92 is ineffective since the roller 92 acts as an overrunning clutch. Conversely, when the pinion portion 100 is rotating in a clockwise direction, the low speed agitate roller 92 will be energized or wedged between the agitate drum 84 and the pinion portion 100, thereby to effect a driving relationship between the pinion and the agitate drum. During this interval of time, the roller 88 will act as an overrunning clutch. It should be emphasized that no additional components are required to withdraw the non-driving roller 88 or 92, merely the rotational direction of the motor or more particularly the driving pinion 94 is effective to cause one or the other of the rollers 88 and 92 to overrun. Note also that the self-energizing arrangement provided for the rollers 88 and 92 is effective to compensate for varying work loads transmitted between the pinion 94 and the spin drum 82 or agitate drum 84. In all instances the greater the load, the greater the driving force between the mating surfaces of the driving pinion 94 and the rollers 88 or 92 and, subsequently, between the rollers 88 or 92 and the spin or agitate drums 82 or 84, respectively.

In addition to the self-energizing or continuously inwardly baised arrangement described in connection with the low speed rollers 88 and 92, the high-speed rollers 86 and 90 may best be understood with reference to FIGURES 8 and 14 wherein the rollers are shown provided with an actuating linkage 102 to withdraw the high-speed rollers selectively when low-speed operation, either spin or agitate, is desired. FIGURE 8 shows the actuating linkage 102 to be comprised of a high-speed pulse or agitate link 390, a high-speed spin link 392, a high-speed pulse or agitate arm 394 and a high-speed spin arm 396. The high-speed spin arm is formed with a bent portion which is turned downwardly at 398 and formed into a pair of roller biasing arms 400 and 402. The arms 400 and 402 are integral with the high-speed spin arm 396 and, thus, move or pivot as a unit about a pin 408. The arms 400 and 402 are provided with nylon bumpers 404 which are interposed between the arms and the upstanding skirt of the roller support cup 134. The arm 396 pivots about the pin 408 which is positively affixed at its upper end in the housing 74 (see FIGURE 16). Thus, whenever the arm 396 is pivoted in a counterclockwise direction to the phantom line position of FIGURE 8, the roller 86 is urged away from the spin drum 82 and the drive pinion portion 96.

Similarly, the agitate arm 394 is formed with downturned integral roller actuating arms 410 and 412 which act through nylon bumpers 414 to move the roller 90 outwardly to the phantom line position whenever the arm 394 is pivoted clockwise about a pin 416 embedded in the depending boss 120 of the motor housing 74. With the links pivotally connected together by the pin 106 and pivotally connected as at 420 and 422 to the spin arm 396 and the agitate arm 394, respectively, the actuating linkage 102 may be urged by the spring 108 into the phantom line position of FIGURE 8 whenever it is desired to withdraw the high-speed rollers 86 and 90 from driving relationship with the spin and agitate drums 82 and 84, respectively. Whenever the rollers 86 and 90 are withdrawn to the phantom line position of FIGURE 8, the low-speed rollers 88 and 92 will become effective to operate the agitator or the spin tub depending on the direction of rotation of the motor 76. Conversely, when the actuating linkage 102 and the rollers 86 and 90 are in the solid line position of FIGURE 8, the high-speed spin or agitate will be effected depending on the rotation of motor 76. In this regard, the high-speed rollers 86 and 90 are provided with a continuous inward or drum and pinion engaging bias opposed to the linkage and tending to maintain the high-speed rollers in the solid line position of FIGURE 8. A spring 417 is wound around the pin 416 and adapted to force the high-speed agitate arm 394 to the solid line postion, whereas a spring 419 performs a similar function for high-speed spin arm 396. If high-speed spin is selected, the spin drum 82 will be driven from the driving pinion portion 96 through the roller 86 and the other three rollers, the high-speed agitate roller 90, the low-speed spin roller 88 and the low-speed agitate roller 92, will merely overrun.

Figure 14:
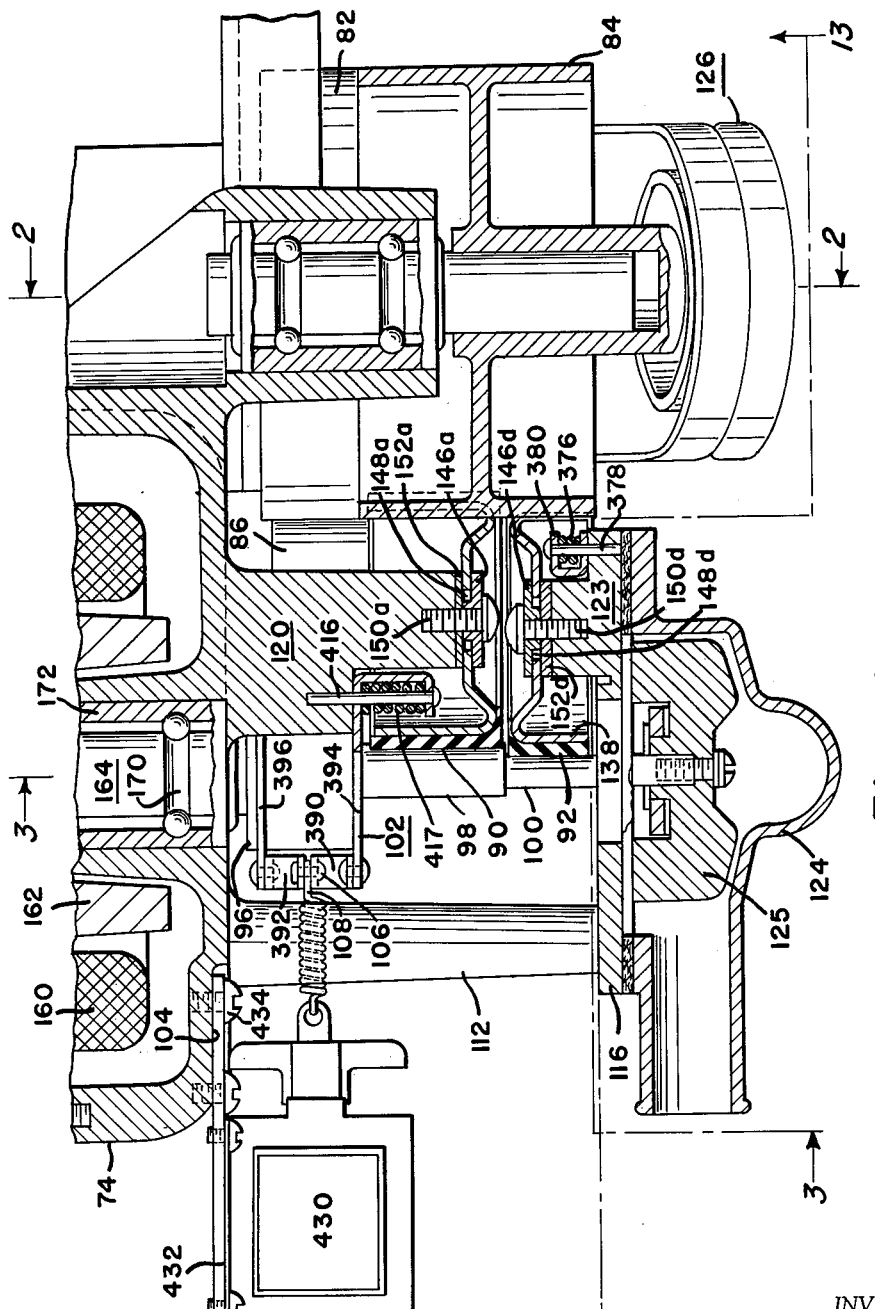
FIGURE 14 is a fragmentary sectional view partly in elevation taken generally along line 14—14 in FIGURE 1.

For operating the actuating linkage 102 a solenoid 430 is adapted to mount to a plate 432 bolted as at 434 to the flattened or recessed area 104 on the motor casing 74 (FIGURE 14). The solenoid 430 is connected to the joined ends of the links 390 and 392 by a spring 108. The spring 108 increases the tolerance allowable, as well as effecting a sound deadening shock absorbing connection between the solenoid and the actuating linkage 102. The view seen in FIGURE 8 is from above the actuating link 102 whereas a fragmentary view of the actuating linkage 102 may also be seen in FIGURE 13 looking upwardly from the low-speed roller level of the mechanism. It should be understood in connection with FIGURE 13, however, that the actuating linkage 102 has no effect whatever on the low-speed rollers 88 and 92 there shown.

Figure 10:
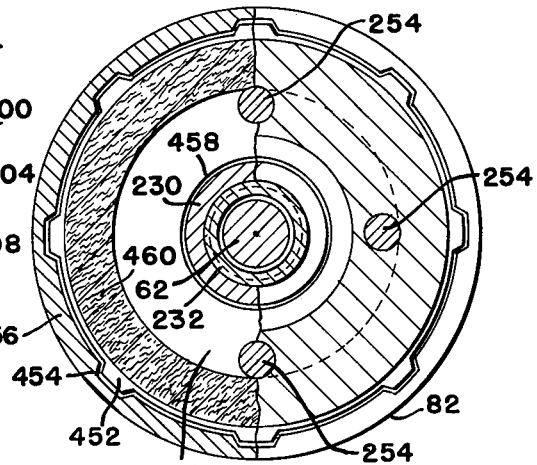
FIGURE 10 is a sectional view taken along line 10—10 in FIGURE 2 to show the mechanism braking means.
Figure 11:
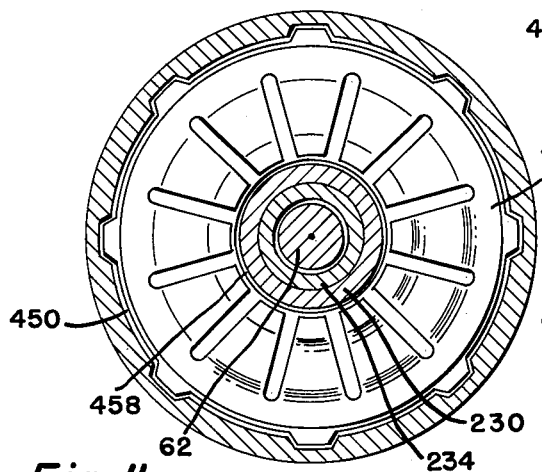
FIGURE 11 is a sectional view of the braking means taken along line 11—11 in FIGURE 2.

The brake system referred to hereinbefore for arresting the rotating movement of the spin tub 34 at the termination of spin will now be described more fully with reference to FIGURES 2, 10 and 11. In FIGURE 2, the brake system is shown to be comprised of the brake disc 252 fixed relative to the motor housing 74 and the stationary shaft enclosing housing 54. Further, the brake system includes a brake plate 450 having a plurality of radially directed fingers 452 which interfit with a similar number of notches 454 in the internally splined or ribbed upstanding flange 456 on the spin drum 82. The brake plate 450 includes an enlarged central aperture 458 to allow for clearance between the central drum collar 230 and the brake plate 450. Since play or clearance exists at the radially outer edge of the brake plate 450 as well as along the radially inner aperture 458, the spin drum 82 is free to move relatively axially to the brake plate. Bonded to the upper surface of the brake plate 450 is a frictional material 460 which may be of phenolic asbestos or other suitable frictional material. Interposed between the brake plate 450 and the web 229 of the spin drum 82 is a loosely fitting spring washer 464. So long as the drum 82 is screwed downwardly into the position of FIGURE 2, no biasing effect is provided by the spring washer 464 on the brake plate 450. Consequently, no particular force exists between the frictional material and the brake disc 252. Thus, the spin drum 82 will rotate freely and this rotation will be transmitted to the spin shaft 64 which, in turn, causes the tub 34 to rotate. At the conclusion of a spinning operation, the tendency of the driving and driven systems is for the spin tub 34 and its load of clothes or water to continue spinning for a longer period of time than the rollers and spin drum 82. Relative turning movement will be effected between the spin shaft 64 and the inwardly threaded collar 230 of the spin drum 82. This relative motion will cause the spin drum 82 to screw itself upwardly along the spin shaft 64, thereby compressing the spring washer 464 and urging the brake plate 450 and its affixed frictional material 460 into compressing engagement with the stationary brake disc 252. This will bring the spin tub 34 quickly to a halt.

Figure 4:
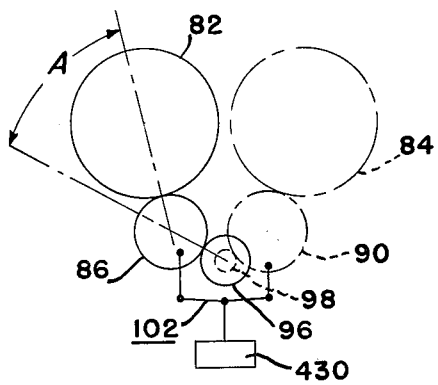
FIGURES 4, 5, 6 and 7 are diagrammatic representations of the roller drive mechanism in relationship, respectively, for high speed spin, high speed agitate, low speed spin and low speed agitate.
Figure 5:
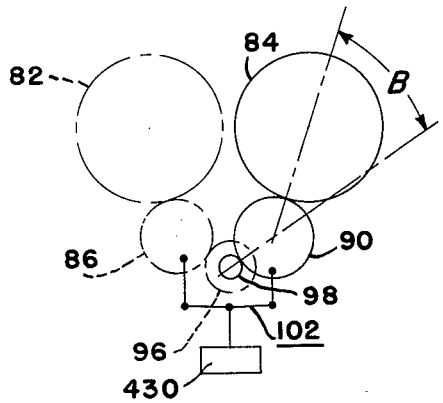

The explanation of the operation of the agitate and spin mechanism 52 of this invention will best be understood with reference to the schematic diagrams of FIGURES 4, 5, 6 and 7. Those rollers, drums or pinion portions actually engaged in driving are shown in solid line with the overrunning or idle rollers, drums or pinion portions in phantom. Let us first assume the motor 76 has been energized for high-speed pulsing or agitating action by any conventional motor switching arrangement. With reference to FIGURE 5, the motor rotation selected will cause the driving agitate and spin pinion portion 98 to be rotated counterclockwise. Since the high-speed pulse or agitate roller 90 is self-energizing and continuously biased inwardly by spring 417, the counterclockwise rotation of the pinion portion 98 will tend to wedge the roller 90 into driving relationship between the pinion portion 98 and the agitate or pulse drum 84. With the drum 84 being driven and with reference to FIGURE 2, it will be seen that the lower angular crank portion 228 of the drum 84 will rotate in the bearing 326 of the pulsator arm assembly 126. The crank shaped terminal end 228 will cause the pulsator arms 320 and 322 to rock in a manner to cause the agitate shaft 62 to vertically reciprocate within the spin shaft 64 and the stationary shaft enclosing housing 54. The spherical bearing 348 acting within the bearing retainer rings 344 and 340 will permit this vertical reciprocation of the shaft 64 while the annular clearance 350 permits a limited amount of universal lateral movement to allow for any variation in movement or thrust of the pulsator arm assembly 126 during rotation of the agitate drum 84. During high-speed agitate rollers 86, 88 and 92 merely overrun and solenoid 430 is deenergized.

Figure 7:
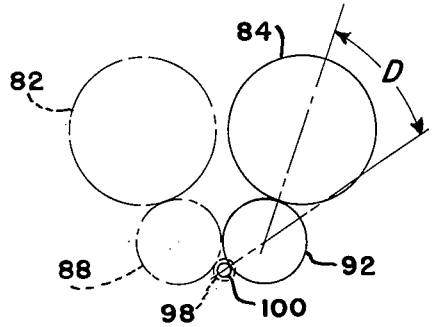

The low-speed pulse agitate is shown schematically in FIGURE 7 wherein the smallest pinion portion 100 drives the low-speed agitate roller 92 which is biased by spring 376 to wedge itself between the pinion portion 100 and the agitate drum 84. The motor 76 is energized for the same direction of rotation (counterclockwise) and at the same speed as for high-speed agitate. However, a different agitate speed is effected in view of the reduced driving pinion size. During low-speed agitate the solenoid 430 is energized to cause the actuating linkage 102 to withdraw the high-speed agitate roller 90 from driving engagement with the agitate drum 84 and to pivot the high-speed spin roller 86 out-of-the-way as well. At this time low-speed spin roller 88 merely overruns.

In high-speed spin the solenoid 430 is again deenergized and the motor 76 energized for reverse rotation (clockwise), still at the same speed. High-speed spin is shown in FIGURE 4 and schematically represents the high-speed spin pinion portion 96 as drivingly engaging the high-speed spin roller 86 which transmits this rotational motion to the spin drum 82. Such motion transmission will cause the spin drum 82 to screw itself downwardly into the position of FIGURE 2 wherein it becomes drivingly connected with the spin shaft 64 and thereby rotates both the spin shaft 64 and the spin tub 34 affixed thereto.

Figure 6:
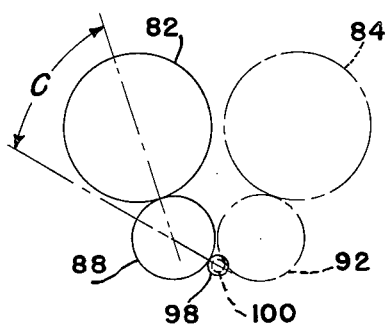

Low-speed spin is accomplished as seen in FIGURE 6 with the agitate and spin pinion portion 98 drivingly engaging the low-speed spin roller 88 which is interposed into driving or motion transmitting engagement between the pinion portion 98 and the spin drum 82. The spin solenoid 430 is energized at this time to withdraw the high-speed spin roller 86 from driving engagement with the pinion 94. Here, too, the driving relationship between the spin drum 82 and the spin shaft 64 is the same as was described in connection with high-speed spin, the different spin speed being gained through the different diameter in the driving pinion.

With the foregoing relationship, it has been found that the following diameters provide especially effective clothes washing and spinning speeds. The high-speed spin roller 86 may be two inches in diameter while the high-speed spin pinion portion or driver 96 has a diameter of 2.187 inches. The low-speed spin roller 88 may have a diameter of 2.5 inches while the spin and agitate pinion portion or driver 98 is 0.843 inch in diameter. Further, a high-speed agitate roller 90 may have a diameter of 2 5/32 inches to cooperate with the spin and agitate pinion portion 98 having the 0.843 inch diameter. Lastly, the low-speed pulse or agitate roller 92 may have a 2 5/32 inch diameter while the smallest low-speed agitate pinion driving portion 100 is 0.562 inch in diameter. Of course, the depth or width of the rollers 86 and 88 is interrelated with the depth or width of the skirt on the spin drum 82. These width dimensions may be varied to provide for additional wear; generally speaking, the more tread on the rollers 86 and 88 the longer the life of the mechanism. These comments re roller life apply equally to the agitate rollers 90 and 92 and agitate drum 84. With the foregoing dimensions a high-speed spin of approximately 1060 r.p.m. will be obtained whereas low-speed spin will be approximately 400 r.p.m. High-speed pulse or agitate will be approximately 370 strokes per minute while low-speed pulse or agitate will be around 250 strokes per minute.

Of particular significance in the self-energizing concept of this invention is the angle of contact between the motion transmitting rollers, the driving pinion and the driven drums. The critical angle of contact between pinion, roller and drum is shown as A in FIGURE 4, B in FIGURE 5, C in FIGURE 6 and D in FIGURE 7. For spin operation angle A should be approximately 49° for high-speed spin and angle C approximately 40° for low-speed spin. For agitate operation, angle B should be approximately 49° for high-speed agitate and angle D approximately 39° for low-speed agitate. With these angles of contact, the rollers are self-energizing and positively transmit motion from the driving pinion 94 to the spin or agitate drums selectively. It is within the purview of this invention to deviate somewhat from the above specified angles of contact without deviating from the concepts of this invention. However, the recited angles have been found most effective in providing a positive drive with extended life characteristics in a clothes washing application.

It should therefore be seen that an improved agitating and spinning mechanism has been devised wherein oil bath lubrication has been eliminated and replaced with dry type bearings. Considerable simplicity has been built into this novel roller drive mechanism which is easily manufactured, quiet in operation, and possessed of good life characteristics.

The foregoing description has been directed to a so-called four speed mechanism, high and low speed agitate and high and low speed spin. It should be appreciated that a two speed mechanism, one agitate speed and one spin speed, is easily facilitated by the teachings of this invention. A two-speed agitating and spinning mechanism is arrived at simply by eliminating the high-speed agitate roller 90, the high-speed spin roller 86 and the linkage 102 used to actuate the rollers 86 and 90. Without the high-speed roller arrangement the direction of rotation of the driving pinion 94 will determine whether the mechanism will set up agitation or spin.

While the embodiments of the present invention as herein disclosed, constitute preferred forms, it is to be understood that other forms might be adopted.

What is claimed is as follows:

1. In combination, a washing machine having a vertically reciprocable agitator and a rotatable spin tub, means for vertically reciprocating said agitator and spinning said tub, said means comprising a prime mover housing having a spacer column, a support plate secured to said spacer column, a reversible motor in said prime mover housing, an agitate shaft, a spin shaft concentric with said agitate shaft, a shaft housing affixed to said prime mover housing and enclosing said shafts, an agitate drum rotatably supported on said prime mover housing and having an integral angularly directed crank portion, a spin drum relatively axially threadedly supported on said spin shaft, a pulsator arm assembly having a rocking end universally movably connected to said agitate shaft and a crank end relatively rotatably connected to said crank portion, a driving pinion drivably connected to said motor and having a large diameter spin portion adjacent said spin drum, an intermediate diameter spin and agitate portion adjacent both said spin drum and said agitate drum, and a small diameter agitate portion adjacent said agitate drum, a high speed spin roller rotatably and relatively laterally movably supported on said prime mover housing between said spin portion and said spin drum, a low speed spin roller rotatably and relatively laterally movably supported on said support plate between said spin and agitate portion and said spin drum, a high speed agitate roller rotatably and relatively laterally movably supported on said prime mover housing between said spin and agitate portion and said agitate drum, a low speed agitate roller rotatably and relatively laterally movably supported on said support plate between said agitate portion and said agitate drum, said rollers having a polyurethane tread in motion transmitting relationship to said driving pinion and said drums, means for biasing said low speed spin roller into continuous engagement with said spin drum and said spin and agitate portion, means for biasing said low speed agitate roller into continuous engagement with said agitate drum and said agitate portion, means for biasing said high speed spin roller into continuous engageemnt with said spin drum and said spin portion, means for biasing said high speed agitate roller into continuous engagement with said agitate drum and said spin and agitate portion, means for selectively overriding the high speed roller biasing effect of said last two biasing means, and control means for operating said motor in one direction for reciprocating said agitator and in another direction for rotating said spin tub.

2. In combination, a washing machine having an agitator and a spin tub, means for moving said agitator and rotating said tub, said means comprising a prime mover housing, a support plate spaced from said housing, a reversible motor in said prime mover housing, an agitate shaft, a spin shaft concentric with said agitate shaft, a shaft housing affixed to said prime mover housing and enclosing said shafts, an agitate drum rotatably supported on said prime mover housing and having an integral angularly directed crank member, a spin drum relatively axially threadedly supported on said spin shaft, a pulsator arm assembly having a rocking end universally movably connected to said agitate shaft and a crank end relatively rotatably connected to said crank member, a driving pinion drivably connected to said motor and having a first portion adjacent said spin drum, and a second portion adjacent said agitate drum, a spin roller rotatably and relatively laterally movably supported on said support plate between said first portion and said spin drum, an agitate roller rotatably and relatively laterally movably supported on said support plate between said second portion and said agitate drum, means for biasing said spin roller into continuous engagement with said spin drum and said first portion, means for biasing said agitate roller into continuous engagement with said agitate drum and said second portion, and control means for operating said motor in one direction for moving said agitator and in another direction for rotating said spin tub.

3. In combination, a washing machine having an agitator and a spin tub, means for moving said agitator and rotating said tub, said means comprising a prime mover housing, a support plate spaced from said housing, a reversible motor in said prime mover housing, an agitate shaft, a spin shaft concentric with said agitate shaft, a shaft housing affixed to said prime mover housing and enclosing said shafts, an agitate drum rotatably supported on said prime mover housing and having an integral angularly directed crank member, a spin drum relatively axially threadedly supported on said spin shaft, a pulsator arm assembly having a rocking end universally movably connected to said agitate shaft and a crank end relatively rotatably connected to said crank member, a driving pinion drivably connected to said motor and having a first portion adjacent said spin drum, and a second portion adjacent said agitate drum, a spin roller rotatably and relatively laterally movably supported on said prime mover housing between said first portion and said spin drum, an agitate roller rotatably and relatively laterally movably supported on said prime mover housing between said second portion and said agitate drum, means for biasing said spin roller into continuous engagement with said spin drum and said first portion and for biasing said agitate roller into continuous engagement with said agitate drum and said second portion, and control means for operating said motor in one direction for moving said agitator and in another direction for rotating said spin tub.

4. In combination, a washing machine having an agitator and a spin tub, means for moving said agitator and rotating said tub, said means comprising a support means, a reversible motor, an agitate shaft, a spin shaft concentric with said agitate shaft, a shaft housing affixed to said support means and enclosing said shafts, an agitate drum rotatably supported on said support means and having an angularly directed crank member, a spin drum relatively axially threadedly supported on said spin shaft, a pulsator arm assembly having one end universally movably connected to said agitate shaft and another end relatively rotatably connected to said crank member, a driving pinion slippingly, drivably connected to said motor and having a first portion adjacent said spin drum and a second portion adjacent said agitate drum, a spin roller rotatably and relatively laterally movably supported on said support means between said first portion and said spin drum, an agitate roller rotatably and relatively laterally movably supported on said support means between said second portion and said agitate drum, means for biasing said spin roller into continuous engagement with said spin drum and said first portion and for biasing said agitate roller into continuous engagement with said agitate drum and said second portion, and control means for operating said motor in one direction for moving said agitator and in another direction for rotating said spin tub.

5. In combination, an agitator and a spin tub, means for moving said agitator and rotating said tub, said means comprising a support member, a reversible motor associated with said support member, an agitate shaft connected to said agitator, a spin shaft concentric with said agitate shaft and connected to said spin tub, an agitate drum rotatably supported by said support member and having an angularly directed crank means, a spin drum supported on said spin shaft, a pulsator arm assembly having a one end universally movably connected to said agitate shaft and another end relatively rotatably connected to said crank means, a driving pinion motivated by said motor and having a first portion adjacent said spin drum and a second portion adjacent said agitate drum, a spin roller rotatably and relatively laterally movably supported by said support member between said first portion and said spin drum, an agitate roller rotatably and relatively laterally movably supported by said support member between said second portion and said agitate drum, means for biasing said spin roller into continuous engagement with said spin drum and said first portion and for biasing said agitate roller into continuous engagement with said agitate drum and said second portion, and control means for effecting operation of said driving pinion in one direction for moving said agitator and in another direction for rotating said spin tub.

6. In combination, an agitator and a spin tub, means for moving said agitator and rotating said tub, said means comprising a stationary support member, a reversible motor associated with said support member, an agitate shaft connected to said agitator, a spin shaft concentric with said agitate shaft and connected to said spin tub, an agitate drum rotatably supported on said support member and having an angularly directed crank means, a spin drum relatively axially movably carried on said spin shaft between first and second positions, a pulsator arm assembly having a rocking end universally movably connected to said agitate shaft and a crank end relatively rotatably connected to said crank means, a driving pinion motivated by said motor and having a first portion adjacent said spin drum and a second portion adjacent said agitate drum, a spin roller rotatably and relatively laterally movably supported by said support member between said first portion and said spin drum, an agitate roller rotatably and relatively laterally movably supported by said support member between said second portion and said agitate drum, means for biasing said spin roller into continuous engagement with said spin drum and said first portion and for biasing said agitate roller into continuous engagement with said agitate drum and said second portion, control means for energizing said motor to effect operation of said driving pinion in a first direction for moving said agitator and in a second direction for rotating said spin tub, said spin drum moving to said first position when said driving pinion is operating in said second direction, and brake means responsive to the relative axial movement of said spin drum to said second position on said spin shaft for stopping said spin tub when said motor is deenergized.

7. In combination, a spin shaft means and an agitate shaft means concentrically arranged, an enclosing housing substantially enclosing the shaft means, the opposite adjacent ends of each of said shaft means protruding out of said housing, said spin shaft having a threaded portion on said protruding end, means preventing relative rotation of said spin and agitate threaded portion shaft means, a spin drum threadedly engaging said threaded portion and having a driving position at one end of said threaded portion and a braking position at the other end of said threaded portion, a brake plate keyed against relative rotation to said spin drum and movable axially relative to said spin drum, a spring member interposed between said brake plate and said spin drum, a brake disc affixed to said enclosing housing adjacent said brake plate, and means for motivating said spin drum to said driving position for rotating said spin shaft means, said spin drum moving to said braking position against the bias of said spring member at the termination of said motivating due to the difference in inertia between said spin shaft and said spin drum to stop said spin shaft means.

8. In combination, two shaft means concentrically arranged, an enclosing housing substantially enclosing the shaft means, the opposite adjacent ends of each of said shaft means protruding out of said housing, means preventing relative rotation of said two shaft means, a spin drum threadedly engaging one of said shaft means and having a driving position and a braking position, a brake plate keyed against relative rotation to said spin drum and movable axially relative to said spin drum, a spring member interposed between said brake plate and said spin drum, a brake disc affixed to said enclosing housing adjacent said brake plate, and means for motivating said spin drum to said driving position for rotating said one of said shaft means, said spin drum moving to said braking position against the bias of said spring member at the termination of said rotating to stop said one of said shaft means.

9. In combination, a washing machine having a vertically reciprocable agitator and a rotatable spin tub, means for vertically reciprocating said agitator and spinning said tub, said means comprising a prime mover housing having a spacer column, a support plate secured to said spacer column, a reversible motor in said prime mover housing, an agitate shaft, a spin shaft concentric with said agitate shaft, a shaft housing affixed to said prime mover housing and enclosing said shafts, an agitate drum rotatably supported on said prime mover housing and having an integral angularly directed crank portion, a spin drum relatively axially threadedly supported on said spin shaft, a pulsator arm assembly having a rocking end universally movably connected to said agitate shaft and a crank end relatively rotatably connected to said crank portion, a driving pinion having a large diameter spin portion adjacent said spin drum, an intermediate diameter spin and agitate portion adjacent both said spin drum and said agitate drum, and a small diameter agitate portion adjacent said agitate drum, clutch means for slippingly connecting said driving pinion to said motor, a high speed spin roller rotatably and relatively laterally movably supported on said prime mover housing between said spin portion and said spin drum, a low speed spin roller rotatably and relatively laterally movably supported on said support plate between said spin and agitate portion and said spin drum, a high speed agitate roller rotatably and relatively laterally movably supported on said prime mover housing between said spin and agitate portion and said agitate drum, a low speed agitate roller rotatably and relatively laterally movably supported on said support plate between said agitate portion and said agitate drum, means for biasing said low speed spin roller into continuous engagement with said spin drum and said spin and agitate portion, means for biasing said low speed agitate roller into continuous engagement with said agitate drum and said agitate portion, means for biasing said high speed spin roller into continuous engagement with said spin drum and said spin portion, means for biasing said high speed agitate roller into continuous engagement with said agitate drum and said spin and agitate portion, means for selectively overriding the high speed roller biasing effect of said last two biasing means, control means for energizing said motor in one direction for reciprocating said agitator and in another direction for rotating said spin tub, and brake means responsive to the relative axial movement of said spin drum on said spin shaft by stopping said spin tub when said motor is deenergized.

10. In combination, a washing machine having a vertically reciprocable agitator and a rotatable spin tub, means for vertically reciprocating said agitator and spinning said tub, said means comprising a prime mover housing having a spacer column, a support plate secured to said spacer column, a reversible motor in said prime mover housing, an agitate shaft, a spin shaft concentric with said agitate shaft, a shaft housing affixed to said prime mover housing and enclosing said shafts, a combination radial and axial thrust ball bearing fixed relative to said shaft housing and adapted to journal and support said spin shaft at one end thereof, a sleeve bearing between said shaft housing and said spin shaft for journalling the other end of said spin shaft, an agitate drum rotatably supported on said prime mover housing and having an integral angularly directed crank portion, a spin drum relatively axially threadedly supported on said spin shaft, a pulsator arm assembly having a rocking end universally movably connected to said agitate shaft and a crank end relatively rotatably connected to said crank portion, a driving pinion drivably connected to said motor and having a large diameter spin portion adjacent said spin drum, an intermediate diameter spin and agitate portion adjacent both said spin drum and said agitate drum, and a small diameter agitate portion adjacent said agitate drum, a high speed spin roller rotatably and relatively laterally movably supported on said prime mover housing between said spin portion and said spin drum, a low speed spin roller rotatably and relatively laterally movably supported on said support plate between said spin and agitate portion and said spin drum, a high speed agitate roller rotatably and relatively laterally movably supported on said prime mover housing between said spin and agitate portion and said agitate drum, a low speed agitate roller rotatably and relatively laterally movably supported on said support plate between said agitate portion and said agitate drum, means for biasing said low speed spin roller into continuous engagement with said spin drum and said spin and agitate portion, means for biasing said low speed agitate roller into continuous engagement with said agitate drum and said agitate portion, means for biasing said high speed spin roller into continuous engagement with said spin drum and said spin portion, means for basing said high speed agitate roller into continuous engagement with said agitate drum and said spin and agitate portion, means for selectively overriding the high speed roller biasing effect of said last two biasing means, and control means for operating said motor in one direction for reciprocating said agitator and in another direction for rotating said spin tub.

11. An agitating and spinning mechanism comprising, two shaft means concentrically arranged, support means for said shaft means, means drivably connected to one of said shaft means for rotating said one of said shaft means, means drivably connected to the other of said shaft means for motivating said other of said shaft means, means rotatably carried by said support means for driving said motivating means, a reversible power shaft means, and self-energizing roller drive means laterally movable with respect to said rotating means, driving means and power shaft means for selectively motion transmittingly connecting said power shaft means with said rotating means or said driving means in response to the direction of said power shaft means for inducing agitating or spinning.

12. In a washing machine, a tub, an agitator in said tub, means for rotatably supporting said tub, a motor, power transmitting means drivingly connecting said motor to said tub for rotating said tub and to said agitator for moving said agitator, said power transmitting means comprising a plurality of self-energizing motion transmitting rollers having different moment arms, and means for selectively transmitting motion through different combinations of rollers to select predetermined different speed ratios between said motor and said tub or said agitator.

13. In a washing machine, a tub, an agitator in said tub, means for rotatably supporting said tub, a motor, power transmitting means drivingly connecting said motor to said tub for rotating said tub and to said agitator for moving said agitator, said power transmitting means comprising a plurality of self-energizing motion transmitting rollers having different moment arms, one of said rollers relatively axially movably carried on said supporting means, means for selectively transmitting motion through different combinations of rollers to select predetermined different speed ratios between said motor and said tub or said agitator, and means responsive to the axial motion of said one of said rollers relative to said supporting means for braking the rotation of said tub.

14. In a washing machine, a tub, an agitator in said tub, means for rotatably supporting said tub, a motor, power transmitting means drivingly connecting said motor to said tub for rotating said tub and to said agitator for moving said agitator, said power transmitting means comprising a plurality of self-energizing motion transmitting rollers having different moment arms, means for selectively transmitting motion through different combinations of rollers to select predetermined different speed ratios between said motor and said tub or said agitator, and means for reversing the driving connection between said motor and said power transmitting means for selectively rotating said tub or moving said agitator.

15. In combination, a washing machine having an agitator and a spin tub, means for moving said agitator and rotating said tub, said means comprising a support member, a reversible motor supported by said support member, an agitate shaft, a spin shaft concentric with said agitate shaft, a shaft housing affixed to carry said support member and enclosing said shafts, an agitate drum rotatably supported by said support member and having an integral angularly directed crank member, a spin drum relatively axially threadedly supported on said spin shaft, a pulsator arm assembly having a rocking end universally movably connected to said agitate shaft and a crank end relatively rotatably connected to said crank member, a driving pinion drivably connected to said motor and having a first portion adjacent said spin drum and a second portion adjacent said agitate drum, a spin roller rotatably and relatively laterally movably supported by said support member between said first portion and said spin drum, an agitate roller rotatably and relatively laterally movably supported by said support member between said second portion and said agitate drum, means for biasing said spin roller into continuous engagement with said spin drum and said first portion and for biasing said agitate roller into continuous engagement with said agitate drum and said second portion, and control means for operating said motor in one direction for moving said agitator and in another direction for rotating said spin tub.

16. In combination, a washing machine having an agitator and a spin tub, means for moving said agitator and rotating said tub, said means comprising a support member, a reversible motor, an agitate shaft, a spin shaft concentric with said agitate shaft, a shaft housing affixed to carry said support member and enclosing said shafts, an agitate drum rotatably supported by said support member and having an angularly directed crank member, a spin drum supported on said spin shaft, a pulsator arm assembly having a rocking end universally movably connected to said agitate shaft and a crank end relatively rotatably connected to said crank member, a driving pinion means drivably connected to said motor and having a first portion adjacent said spin drum and a second portion adjacent said agitate drum, a spin roller rotatably and relatively laterally movably supported by said support member between said first portion and said spin drum, an agitate roller rotatably and relatively laterally movably supported by said support member between said second portion and said agitate drum, means for biasing said spin roller into continuous engagement with said spin drum and said first portion and for biasing said agitate roller into continuous engagement with said agitate drum and said second portion, and control means for operating said motor in one direction for moving said agitator and in another direction for rotating said spin tub.

17. In combination, a washing machine having an agitator, means for moving said agitator, said means comprising a support member, a reversible motor, an agitate shaft, a shaft housing affixed to carry said support member and enclosing said shaft, an agitate drum rotatably supported by said support member and having an angularly directed crank member, a pulsator arm assembly having a rocking end universally movably connected to said agitate shaft and a crank end relatively rotatably connected to said crank member, a driving pinion means drivably connected to said motor and having a portion adjacent said agitate drum, an agitate roller rotatably and relatively laterally movably supported by said support member between said portion and said agitate drum, means for biasing said agitate roller into continuous engagement with said agitate drum and said portion, and control means for operating said motor in one direction only for moving said agitator.

18. In a washing machine, a tub, means for agitating in said tub, means for rotatably supporting said tub, a motor, power transmitting means drivingly connecting said motor to said tub and said agitating means for rotating said tub and for moving said agitating means, said power transmitting means comprising a plurality of self-energizing motion transmitting rollers having different moment arms, and means for selectively transmitting motion through different combinations of rollers to select predetermined different speed ratios between said motor and said tub and said agitating means.

19. In the washing machine of claim 18 wherein one of said rollers is relatively movably carried on said supporting means, and including means responsive to the motion of one of said rollers relative to said supporting means for braking the rotation of said tub.

20. In the washing machine of claim 18 at least one of said motion transmitting rollers having a polyurethane tread.

21. In combination, two shaft means concentrically arranged, an enclosing housing substantially enclosing the shaft means, the opposite adjacent ends of each of said shaft means protruding out of said housing, means preventing relative rotation of said two shaft means, a spin drum threadedly engaging one of said shaft means and having a driving position and a braking position, a first brake portion fixed against relative rotation to said spin drum and movable axially relative to said spin drum, a spring member interposed between said first brake portion and said spin drum, a second brake portion affixed to said enclosing housing adjacent said first brake portion, and means for motivating said spin drum to said driving position for rotating said one of said shaft means, said spin drum moving to said braking position against the bias of said spring member at the termination of said rotating to stop said one of said shaft means.

References Cited in the file of this patent
UNITED STATES PATENTS

| | | |
|---|---|---|
| 1,935,145 | Davis | Nov. 14, 1933 |
| 2,241,013 | Gay | May 6, 1941 |
| 2,533,722 | DeRemer | Dec. 12, 1950 |
| 2,728,428 | Cohen | Dec. 27, 1955 |
| 2,783,861 | Jungles | Mar. 5, 1957 |
| 2,841,003 | Conlee | July 1, 1958 |
| 2,845,156 | Dayton | July 29, 1958 |
| 2,930,215 | Smith | Mar. 29, 1960 |
| 2,983,794 | Shields | May 9, 1961 |
| 2,992,564 | Blik | July 18, 1961 |